(12) United States Patent
Chen et al.

(10) Patent No.: US 8,752,030 B1
(45) Date of Patent: Jun. 10, 2014

(54) PROCESS ABSTRACTION AND TRACKING, SYSTEMS AND METHODS

(75) Inventors: Zhong Chen, Acton, MA (US); Hongqi Jia, Boxborough, MA (US); Chunsheng Chen, Arlington, MA (US); Gang Fu, Shrewsbury, MA (US)

(73) Assignee: Verizon Services Corp., Ashburn, VA (US)

( * ) Notice: Subject to any disclaimer, the term of this patent is extended or adjusted under 35 U.S.C. 154(b) by 2010 days.

(21) Appl. No.: 11/371,234

(22) Filed: Mar. 9, 2006

(51) Int. Cl.
  *G06F 9/44* (2006.01)
  *G06Q 10/00* (2012.01)
(52) U.S. Cl.
  USPC ......... 717/135; 705/7.12; 705/7.27; 717/121; 719/328
(58) Field of Classification Search
  None
  See application file for complete search history.

(56) References Cited

U.S. PATENT DOCUMENTS

| | | | | |
|---|---|---|---|---|
| 5,557,774 | A * | 9/1996 | Shimabukuro et al. | 703/21 |
| 5,574,855 | A * | 11/1996 | Rosich et al. | 714/41 |
| 5,579,476 | A * | 11/1996 | Cheng et al. | 714/32 |
| 5,799,297 | A * | 8/1998 | Goodridge et al. | 1/1 |
| 5,826,061 | A * | 10/1998 | Walp | 716/108 |
| 6,038,538 | A * | 3/2000 | Agrawal et al. | 705/7 |
| 6,349,238 | B1 | 2/2002 | Gabbita et al. | |
| 6,424,948 | B1 * | 7/2002 | Dong et al. | 705/9 |
| 6,574,675 | B1 * | 6/2003 | Swenson | 719/316 |
| 6,697,784 | B2 * | 2/2004 | Bacon et al. | 705/9 |
| 6,845,507 | B2 * | 1/2005 | Kenton | 719/314 |
| 6,868,454 | B1 * | 3/2005 | Kubota et al. | 709/237 |
| 6,937,993 | B1 | 8/2005 | Gabbita et al. | |
| 6,980,944 | B1 * | 12/2005 | Oshins et al. | 703/17 |
| 6,983,371 | B1 | 1/2006 | Hurtado et al. | |
| 7,296,080 | B2 * | 11/2007 | Rowley et al. | 709/231 |
| 7,315,807 | B1 * | 1/2008 | Lavallee et al. | 703/21 |
| 7,370,335 | B1 * | 5/2008 | White et al. | 719/328 |
| 7,506,302 | B2 * | 3/2009 | Bahrami | 717/100 |
| 7,509,628 | B2 * | 3/2009 | Hilerio et al. | 717/103 |
| 7,516,120 | B2 * | 4/2009 | Ghazaleh | 1/1 |
| 7,653,566 | B2 * | 1/2010 | Kim et al. | 705/7.13 |
| 7,680,925 | B2 * | 3/2010 | Sathyanarayana et al. | 709/224 |
| 7,970,729 | B2 * | 6/2011 | Cozzi | 707/601 |
| 8,296,424 | B2 * | 10/2012 | Malloy et al. | 709/224 |
| 8,417,499 | B2 * | 4/2013 | Chen et al. | 703/13 |
| 8,423,451 | B1 * | 4/2013 | Flaxman et al. | 705/38 |
| 8,429,527 | B1 * | 4/2013 | Arbogast | 715/255 |
| 8,489,498 | B1 * | 7/2013 | Flaxman et al. | 705/38 |
| 8,539,514 | B2 * | 9/2013 | Makam et al. | 719/320 |
| 2002/0032692 | A1 * | 3/2002 | Suzuki et al. | 707/200 |
| 2002/0129337 | A1 * | 9/2002 | Evans et al. | 717/124 |
| 2002/0138556 | A1 * | 9/2002 | Smithline et al. | 709/203 |

(Continued)

OTHER PUBLICATIONS

Miller et al., Simulation Modeling Within Workflow Technology, Proceedigs of the 1995 Winter Simulation Conference, published 1995, pp. 612-619.*

*Primary Examiner* — Tuan Q. Dam
*Assistant Examiner* — Zheng Wei (57) ABSTRACT

The present invention is an abstraction layer that "hides" the complexity of underlying workflow engine and provides a unified application programming interface (API) to access underlying workflow functions. The abstraction layer of the present invention serves as a gateway between application flow logic and one or more workflow engines and allows an application to build flow implementation logic once and then be able to run on various workflow engines without significant code changes. The present invention also enables different workflow engines to run concurrently to support one application and without the need for applications to migrate or consolidate to one workflow engine.

27 Claims, 9 Drawing Sheets

(56) References Cited

U.S. PATENT DOCUMENTS

| | | | |
|---|---|---|---|
| 2003/0061017 A1* | 3/2003 | Dotaro et al. | 703/14 |
| 2003/0069803 A1* | 4/2003 | Pollitt | 705/26 |
| 2003/0093256 A1* | 5/2003 | Cavanagh et al. | 703/14 |
| 2004/0015813 A1* | 1/2004 | Yerushalmy | 717/100 |
| 2004/0024622 A1* | 2/2004 | Knight | 705/7 |
| 2004/0064731 A1* | 4/2004 | Nguyen et al. | 713/201 |
| 2004/0220790 A1* | 11/2004 | Cullick et al. | 703/10 |
| 2004/0260593 A1* | 12/2004 | Abraham-Fuchs et al. | 705/8 |
| 2005/0097450 A1* | 5/2005 | Lumera et al. | 715/511 |
| 2005/0097462 A1* | 5/2005 | Lumera et al. | 715/522 |
| 2005/0197821 A1* | 9/2005 | Choi et al. | 703/22 |
| 2005/0203771 A1* | 9/2005 | Achan | 705/2 |
| 2006/0067250 A1* | 3/2006 | Boyer et al. | 370/260 |
| 2006/0067252 A1* | 3/2006 | John et al. | 370/261 |
| 2006/0074725 A1* | 4/2006 | Huang et al. | 705/7 |
| 2006/0106641 A1* | 5/2006 | Bartsch et al. | 705/2 |
| 2006/0195817 A1* | 8/2006 | Moon | 717/104 |
| 2007/0067373 A1* | 3/2007 | Higgins et al. | 707/206 |
| 2007/0094562 A1* | 4/2007 | Bingham | 714/741 |
| 2007/0156888 A1* | 7/2007 | Hilerio et al. | 709/224 |
| 2007/0250335 A1* | 10/2007 | Hodges et al. | 705/1 |
| 2007/0277158 A1* | 11/2007 | Li et al. | 717/135 |
| 2007/0299686 A1* | 12/2007 | Hu et al. | 705/1 |
| 2009/0094278 A1* | 4/2009 | Andrews | 707/104.1 |
| 2011/0060573 A1* | 3/2011 | Cullick et al. | 703/10 |
| 2012/0137309 A1* | 5/2012 | Makam et al. | 719/320 |
| 2013/0046887 A1* | 2/2013 | Malloy et al. | 709/224 |

* cited by examiner

| Workflow Instance | Start Time | Status History | Complete Time |
|---|---|---|---|
| ⊟ 🗏 FP Local Add (Instance1977265) | | | |
|   Page 1 of 2  Options | | | |
|   ⊞ ⬇ Order Preprocessing | 2005-06-10 15:36:44.0 | | 2005-06-10 15:37:03.0 |
|   ⊞ ⬇ Cancel | 2005-06-10 15:37:03.0 | | |
|   ⊞ ⬇ Update | 2005-06-10 15:37:07.0 | | |
|   ⊞ ⬇ Data Gathering | 2005-06-10 15:37:11.0 | | 2005-06-10 15:37:16.0 |
|   ⊞ ⬇ Billing Account Management | 2005-06-10 15:37:17.0 | | 2005-06-10 16:00:59.0 |
|   ⊞ ⬇ Wait For Mandatory Related Order Provisioning Info | 2005-06-10 16:00:59.0 | | 2005-06-10 16:01:00.0 |
|   ⊟ ⬇ Order Provisioning | 2005-06-10 16:01:01.0 | | 2005-06-10 16:29:00.0 |
|     Page 1 of 5  Options | | | |
|     ⊞ ⬇ Send Provisioning Request (1977265) | 2005-06-10 16:01:01.0 | Completed | 2005-06-10 16:01:07.0 |
|       ⬇ Update Provisioning Response (1977265) | 2005-06-10 16:02:38.0 | Completed | 2005-06-10 16:02:41.0 |
|       ⬇ Check For Error (1977265) | 2005-06-10 16:02:41.0 | Completed | 2005-06-10 16:02:42.0 |
|       ⬇ Check For Cancel Completion (1977265) | 2005-06-10 16:02:43.0 | Completed | 2005-06-10 16:02:43.0 |
|       ⬇ Set Cancelled Status If Reqd (1977265) | 2005-06-10 16:02:44.0 | Completed | 2005-06-10 16:02:44.0 |
|       ⬇ Check For Completion (1977265) | 2005-06-10 16:02:44.0 | Completed | 2005-06-10 16:02:46.0 |
|     ⊞ ⬇ Send Provisioning Request (1977265) | 2005-06-10 16:02:47.0 | Completed | 2005-06-10 16:02:52.0 |
|       ⬇ Update Provisioning Response (1977265) | 2005-06-10 16:03:13.0 | Completed | 2005-06-10 16:03:17.0 |
|       ⬇ Check For Error (1977265) | 2005-06-10 16:03:18.0 | Completed | 2005-06-10 16:03:21.0 |
|     ⊞ ⬇ Send Provisioning Request (1977265) | 2005-06-10 16:03:22.0 | Completed | 2005-06-10 16:03:27.0 |
|     ▼ Page 1 of 5 | | | |

PROCESS ABSTRACTION AND TRACKING, SYSTEMS AND METHODS

BACKGROUND INFORMATION

1. Technical Field

Embodiments of the present invention generally relate to work flow management (a/k/a business process management (BPM)) products, and particularly relate to an abstraction layer that allows one or more BPM's to interface with one or more applications with the addition of abstraction-layer features.

2. Description of Related Art

There are many workflow/BPM (Business Process Management) products available including those that are commercially available and those developed in-house. Many of these products are developed using different workflow engines as a component of the BPM. The big challenge is that different application implementation is required for different workflow engine products. Those product implementations cannot co-exist in a homogeneous deployment environment easily and therefore produce problems in system integration, product upgrade and migration. There are some open standards in workflow area; however, those standards only address the definition part of the flow process. Existing workflow standards do not have a unified interface to define all workflow functionalities. Moreover, there are many areas that standards leave to vendor implementation purposely, such as work assignment and dispatch, administrative flow management, runtime flow status display, etc.

Organizations make use of many workflow products in various systems and application products may have their own workflow providers and need to integrate external ones as well. On user interface side, an application desirably exposes the client to a consistent look and feel for business process management functionalities. On the flow implementation side, an application tries to avoid workflow-vendor-specific implementation to promote code reuse and flexibility. On the development and testing side, an application wants to have a set of tools to help and automate daily implementation, debugging and testing.

DETAILED DESCRIPTION OF PREFERRED EMBODIMENTS

The preferred embodiments implemented according to the present invention now will be described more fully with reference to the accompanying drawings, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

As will be appreciated by one skilled in the art, the preferred embodiments may be embodied as a method, a data processing system, or a computer program product. Accordingly, the preferred embodiments may take the form of an entirely hardware embodiment, an entirely software embodiment, or an embodiment combining software and hardware aspects. Furthermore, the preferred embodiments may take the form of a computer program product on a computer-readable storage medium having computer-readable program instructions (e.g., computer software) embodied in the storage medium. More particularly, the preferred embodiments may take the form of web-implemented computer software. Any suitable computer-readable storage medium may be utilized including hard disks, CD-ROMs, optical storage devices, or magnetic storage devices.

The preferred embodiments are described below with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1A:
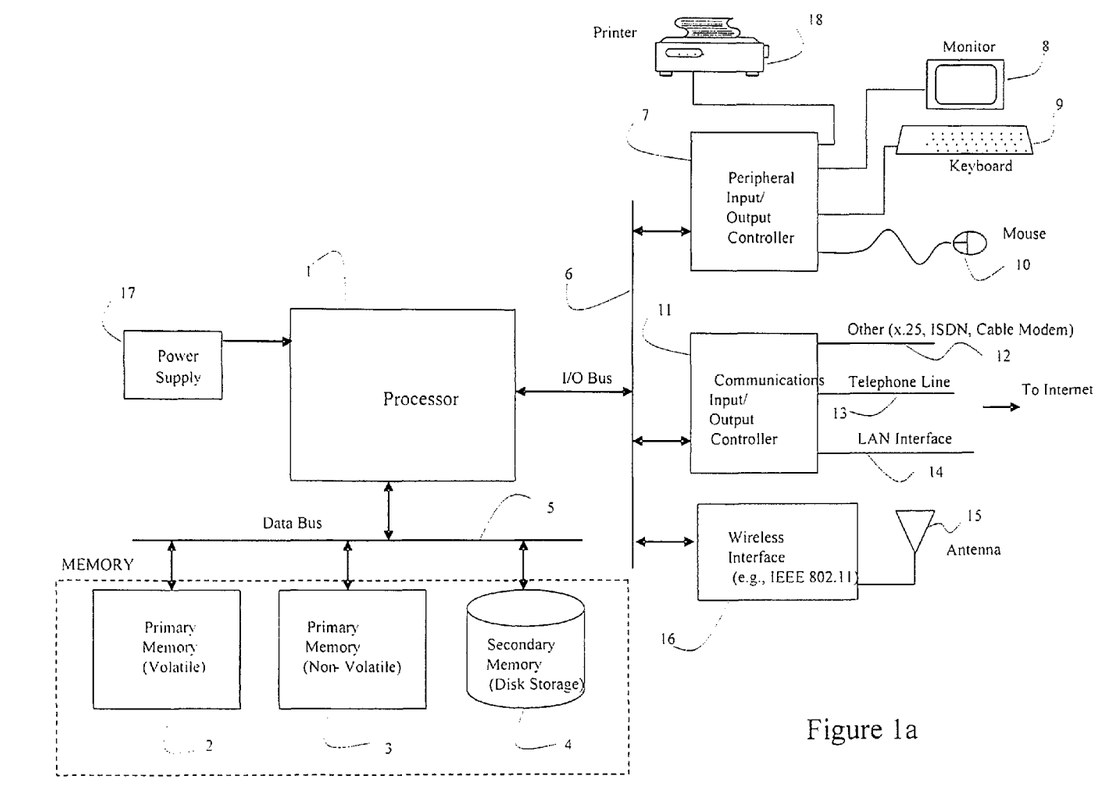
FIG. 1a is an illustration of one embodiment of a computer that can be used to practice embodiments of the present invention.

In the preferred embodiments of the invention referenced herein, a "computer" or "computing device" may be referenced. The computer may be, for example, a mainframe, desktop, notebook or laptop, a hand held device such as a data acquisition and storage device, or it may be a processing device embodied within another apparatus such as, for example, a set top box for a television system. In some instances the computer may be a "dumb" terminal used to access data or processors over a network. Turning to FIG. 1a, one embodiment of a computer is illustrated that can be used to practice aspects of the preferred embodiments. In FIG. 1a, a processor 1, such as a microprocessor, is used to execute software instructions for carrying out the defined steps. The processor receives power from a power supply 17 that also provides power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access the Internet, intranets, LANs, or other data communication facilities.

Finally, the processor 1 may communicate with a wireless interface 16 that is operatively connected to an antenna 15 for communicating wirelessly with another device, using for example, one of the IEEE 802.11 protocols, 802.15.4 protocol, or a standard 3G wireless telecommunications protocols, such as CDMA2000 1xEV-DO, GPRS, W-CDMA, or other protocol.

Figure 1B:
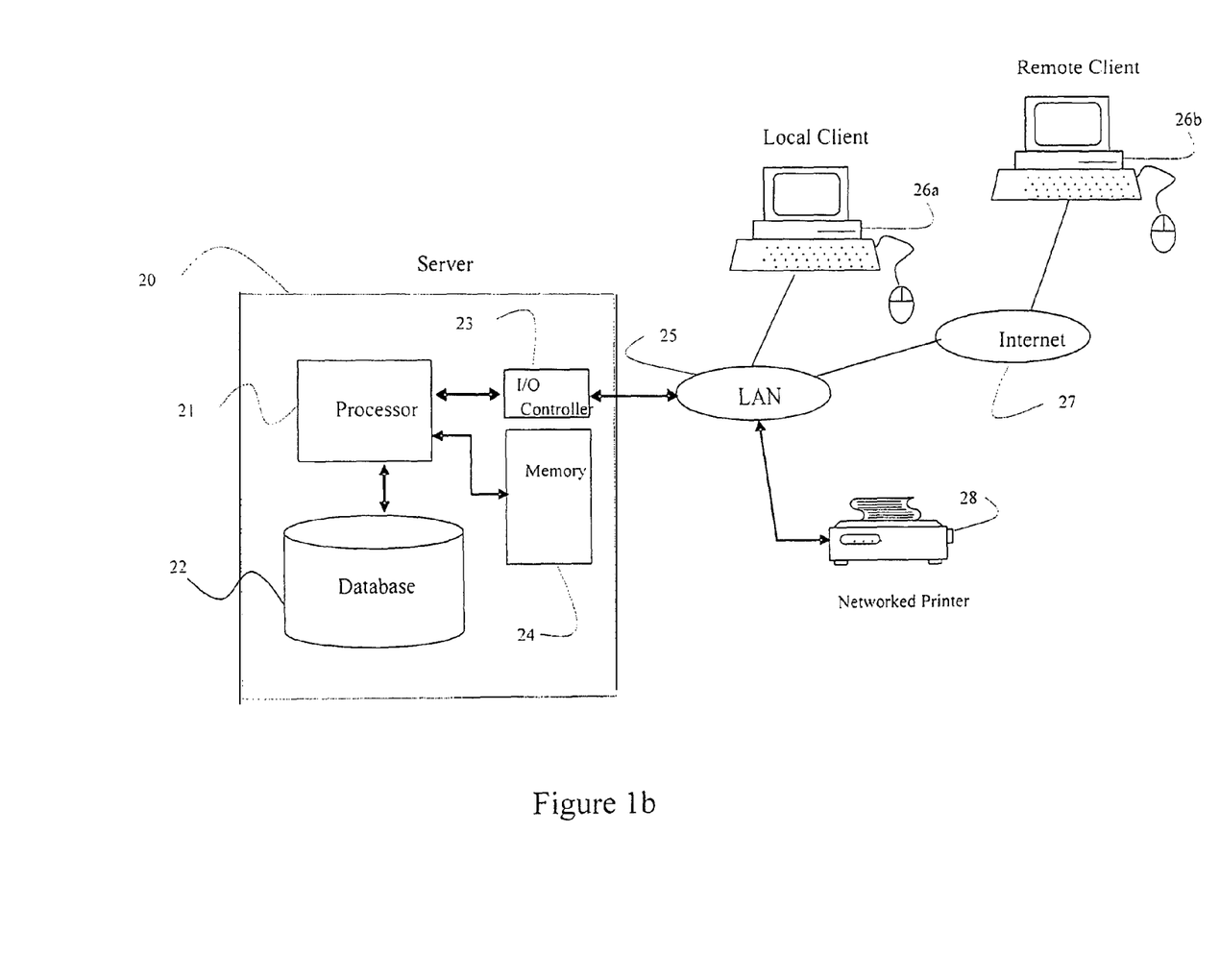
FIG. 1b is an embodiment of a processing system having a distributed communication and processing architecture that may be used to practice embodiments of the present invention.

An alternative embodiment of a processing system that may be used is shown in FIG. 1b. In this embodiment, a distributed communication and processing architecture is shown involving a server 20 communicating with either a local client computer 26a or a remote client computer 26b.

The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to the Internet 27. A remote client computer 26b may execute a web browser, so that the remote client 26b may interact with the server as required by transmitted data through the Internet 27, over the LAN 25, and to the server 20.

Those skilled in the art of data networking will realize that many other alternatives and architectures are possible such as, for example, the set top boxes contemplated herein can be used in implementing the preferred embodiments described herein. The embodiments illustrated in FIGS. 1a and 1b can be modified in different ways and be within the scope of the present invention as claimed.

Overview

Figure 2A:
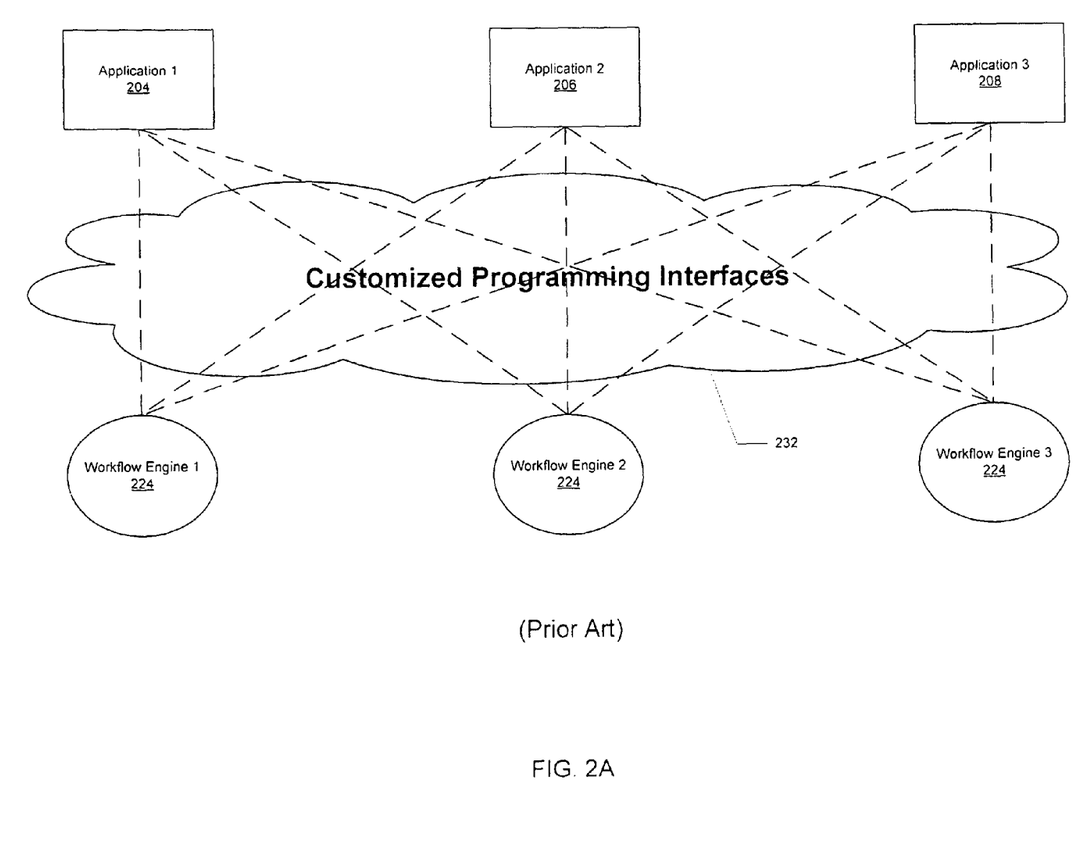
FIG. 2A is an illustration of exemplary prior art requiring customized programmed interfaces between each application and each workflow engine.

Generally, workflow engines interact with one or more business applications to route "work" to designated parties or to perform certain steps as part of a flow. The use of workflow engines helps provide standardization, efficiency and tracking to a business's processes. In many instances, and as shown in FIG. 2A, the interaction between an application 204 and a workflow engine 224 is accomplished through a customized programming interface 232. The use of such customized interfaces 232 creates additional expenses and decreases the flexibility and responsiveness of the business's workflow management system.

Figure 2B:
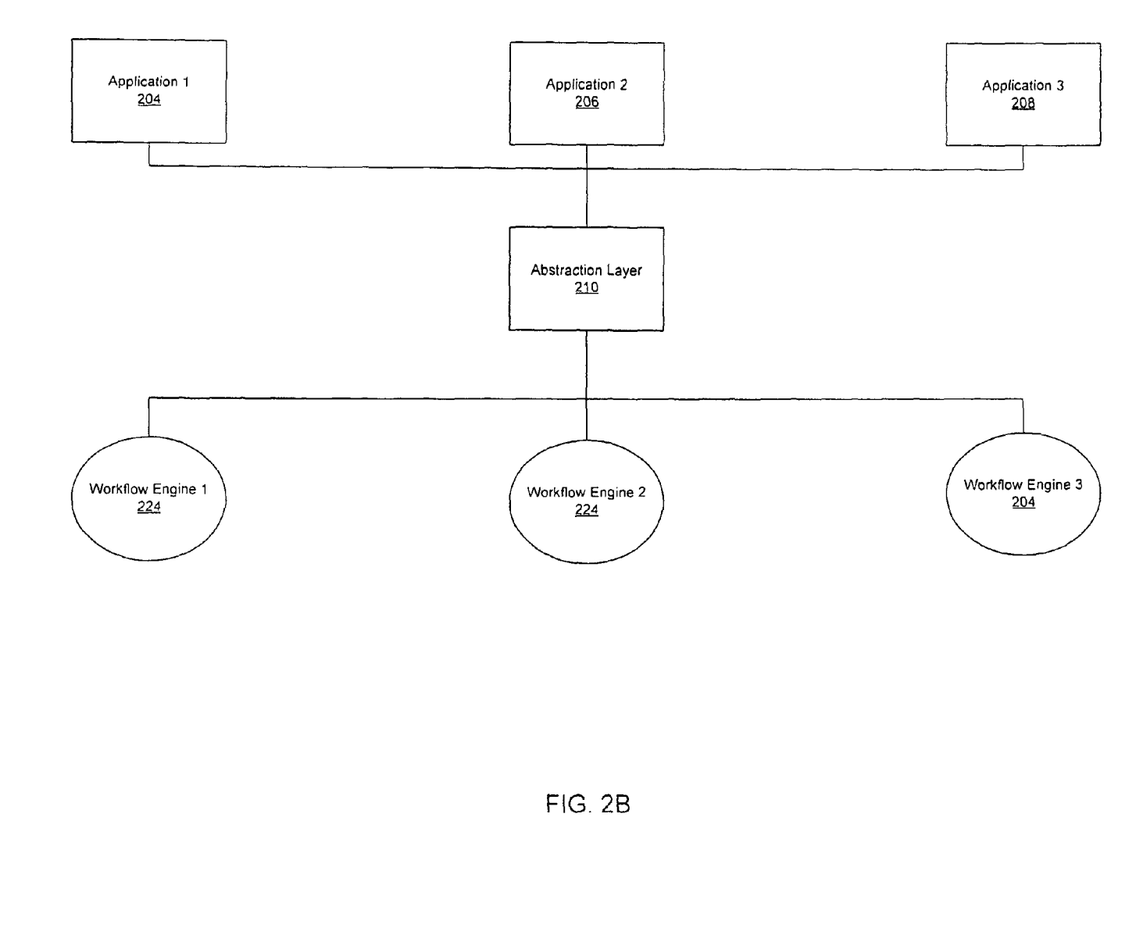
FIG. 2B is an illustration of an exemplary abstraction layer that provides an interface between each application and each workflow engine that may be used to practice embodiments of the invention.
Figure 2C:
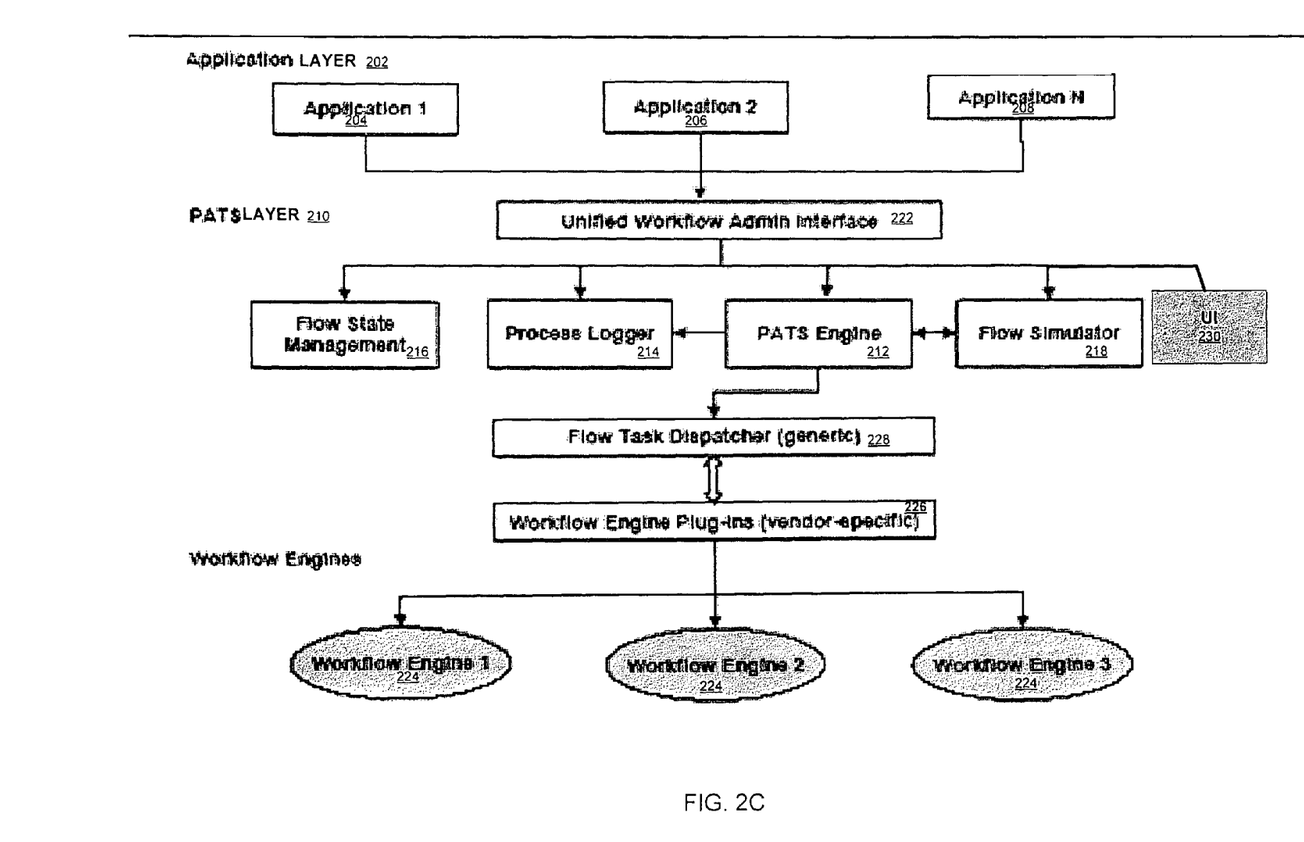
FIG. 2C is an illustration of an exemplary network architecture that may be used to practice one or more embodiments of the present invention.

FIG. 2B is an illustration of an exemplary abstraction layer 210 that provides an interface between each application 204, 206, 208 and each workflow engine 224 that may be used to practice embodiments of the invention. In this instance, the abstraction layer 210 provides a singular interface between the applications 204, 206, 208 and the workflow engines 224. As further described herein and as shown in FIG. 2C, the applications 204, 206, 208 may interact with the abstraction layer 210 through a unified workflow administrative interface 222 using API calls and the workflow engines 224 may interact with the abstraction layer 210 using plug-ins 226 that communicate with a flow task dispatcher 228. This provides flexibility and ease of installation, modification and removal of workflow engines 224 and applications 204, 206, 208. The applications 204, 206, 208, the abstraction layer 210 and the workflow engines may be executed using one or more processors as described in FIGS. 1a and 1b of one or more computing devices and at least the executable code for the applications 204, 206, 208, abstraction layer 210 and workflow engines 224 may be stored in a memory device associated with one or more computing devices as described in FIGS. 1a and 1b.

FIG. 2C is an overall block diagram illustrating a system implementing the preferred embodiments of the present invention. In FIG. 2C, an application layer 202 is comprised of one or more applications such as Application 1 204, Application 2 206, . . . , Application n 208. The applications may be deployed on one or more computing platforms of devices, which may be interconnected by a network. The applications may be, for example, an integrated online telecommunications ordering system as further described below, which is comprised of computer-implemented instructions that are stored in memory in a manner that is accessible to and executable by the processor as described in FIGS. 1a and 1b. The applications in the application layer 202 interface with a process abstraction and tracking system ("PATS") layer 210 through a unified workflow administration interface 222. The PATS layer 210 is comprised of a PATS engine 214 and one or more modules that may include monitoring and logger utilities through a process logger 216, a flow state manager 218, and a flow simulator 220, which are each described in more depth below. The PATS engine 214 and the associated modules are also generally comprised of computer-implemented instructions that are stored in memory in a manner that is accessible to and executable by the processor as described in FIGS. 1a and 1b.

Exemplary applications include an integrated online ordering system for a wireless telecommunications provider. The application in this example takes order information from a web browser and pushes it back to backend legacy systems for processing. In the exemplary application, the PATS layer 210 creates a workflow instance in which it automatically interacts with a circuit tracking system, order provisioning system, and a billing system. In this instance a circuit tracking system is used by a telecommunications provider to store and track information about the provider's various circuits. The circuit tracking system, in this example, tracks the running status of each of the provider's circuits. When an order is taken, the service normally requires the creation of a new circuit or changes to an existing circuit. Therefore, the ordering system interacts with the circuit tracking system to maintain the status of the provider's circuits. In this instance, the flow includes interactive tasks for contract review, circuit testing and billing verification.

The PATS layer 210 is also comprised PATS engine 212 that is used to carry out the functions of the PATS layer 210. The PATS engine 212 is responsible for executing application code, maintaining the PATS layer's 210 internal state information and providing coordination between various PATS layer 210 modules such as, for example, the process logger 216, a flow state manager 218, and a flow simulator 220.

The PATS layer 210 is an abstraction layer that "hides" the complexity of underlying workflow engines 224, each of which are comprised of computer-implemented instructions and are stored in memory in a manner that is accessible to and executable by the processor as described in FIGS. 1a and 1b. The PATS layer 210 provides a unified application programming interface (API) to access underlying workflow functions. It serves as a gateway between application flow logic and one or more workflow engines 224. The PATS layer 210 allows an application to build flow implementation logic once and then be able to run on various workflow engines 224 without significant code changes. The PATS layer 210 also enables different workflow engines 224 to run concurrently to support one application without the need to migrate or consolidate to one workflow engine, thereby facilitating load balancing and increasing the efficiency with which the workflow engines can respond to the applications.

The preferred embodiments of the present invention use a "service provider" architecture design that allows easy plug-ins for different workflow engines 224. For each workflow engine 224, a service provider 226 is implemented to plug the workflow engine into the PATS layer 210. Plug-ins are known in the art and generally are self-contained software components that modify (adds or changes) functions in a particular software system. When a user adds a plug-in to a software system, the foundation of the original software system remains intact. The development of plug-ins requires well defined application programming interfaces (APIs). The plug-in performs a translation function so that the generic language of the applications can communicate with the more specific language of a workflow engine 224. The plug-in is designed to communicate with both, underlying workflow engines 224 and the generic PATS layer 210. Generally, different workflow engines behave differently, therefore the plug-in bridges the difference between the workflow engine 224 and the PATS layer 210. Therefore, when one or more applications interact with the PATS layer 210, they are presented with one unified interface, thus enabling workflow engine transparency to the one or more applications.

Unlike other service provider architecture designs that require adapters developed for both the client and server, in an exemplary embodiment according to the present invention a generic implementation on the application side of the workflow engine 224 called a flow task dispatcher 228 is utilized. The flow task dispatcher 228 is generally installed in an application program and facilitates communication between workflow engines 224 and applications 204, 206, 208 (compare to plug-ins 226 that generally run inside a workflow engine 224). Plug-ins 226 and flow task dispatchers 228 use one or more standard protocols defined by the PATS layer 210 to exchange information, which is transparent to the applications as there are not different flow task dispatchers for different workflow engines. 224 The flow task dispatcher 228 has a well-defined interface and is not vendor-specific. The flow task dispatcher 228 communicates with workflow engine plug-ins 226 via, for example, pre-defined Enterprise JavaBeans (EJB) and Java Messaging Services (JMS) interfaces, as are known in the art. Therefore, only the configuration of an application's flow needs to change by routing the flow to and from a different workflow engine. With one common flow task dispatcher 228, an application has the benefit of switching to different workflow engines 224 without code change or redeployment. Therefore, there is no need to deploy a separate flow task dispatcher 228 for each workflow engine 224, though this is not precluded in the preferred embodiments. Thus, applications are able to use all supported workflow engines 224.

Workflow Engine

Generally, workflow engines 224 are a component of commercial workflow management system (WFMS) products and are often referred to as BPM (Business Process Management) applications and may include extra services. In some instances, however, the workflow engines 224 may be developed for specific entities or purposes or be a combination of commercial and "in-house" developed products. Workflow engines 224 provide for the automation of business processes (workflows), during which information and/or tasks are passed along based on procedural or business rules. Business processes control which piece of work will be performed by whom and which resources are exploited for this work, i.e. a business process describes how an enterprise will achieve its business goals. A WFMS may support both, the modeling of business processes and their execution.

Generally, a workflow engine recognizes the tasks of each business process in the workflow and determines whether the business process is ready to move to the next task. In some instances, there may be many workflow engines 224 as there may be a need for different implementations for different engines. Presently, there is no easy way for different engines to co-exist because of vendor-specific requirements for each vendor's engine. In addition, it is also difficult to migrate workflow processes when switching engines or vendors, as flow implementations are tied to vendor implementations.

Although there are some workflow standards, these standards try to define the core functions but leave add-on features (e.g., monitoring, work assignment, etc) to vendor-specific implementations. Existing workflow manager standards are more directed toward static flow process definitions, but not toward systems or process of providing the appearance of a generic virtual workflow engine at run time. Many of the major industrial players have adapted different standards, which makes it difficult for users to interface the workflow managers with applications.

The embodiments of the PATS layer 210 provide a portal that has its own application user interface (UI) 230 that exposes the user to one or more core workflow functions. This allows a consistent look and feel on the UI 230 regardless of the workflow engine 224 servicing an application and provides work list management based on a user's business processes. The UI 230 enables flow status display for end-to-end visibility of business flows and provides flow diagnostics needed for debugging and testing. For example, the UI 230 may display an application workflow similar to the one shown in FIG. 4. In one embodiment, the workflow tasks may be displayed in different colors to indicate the status of a working flow. In an exemplary implementation of a UI, a user is able to view the overall status of a working flow where a different color box is used for each task. In this example, a user may "click" on a task with a cursor associated with the UI to see more detailed information about the task such as for example starting time, end time (if done), and pending reason (if not done). Debugging may be performed based on task status. An exemplary color scheme for task boxes may be, for example:

White—when a task hasn't started its execution. No debugging can be done on tasks with this status.

Gray—task has been completed. No debugging can be done on tasks with this status.

Green—task is waiting for user input in order to continue. Normally user will use application UI to send input to workflow. When debugging, a flow developer can bypass a customized application UI and interact with flow directly. After clicking on task, user will get information about what the flow is expecting from the UI. The developer can then type in the response message and send input directly to the flow. After that, the UI will refresh and retrieve new status for tasks.

Blue—task is waiting for response from external system. Normally no user intervention is needed since the response should come from another system automatically. In a development environment, however, a developer can choose to post a response manually. This is helpful when an external system is not available for testing or it takes too long for the external system to respond. It provides an easy simulation environment for responses in different test cases.

Red—task has encountered some critical error. User intervention is required to correct any errors. Similar to a green task, a red task can be processed directly from the debugging UI.

Yellow—task has encountered some non-critical error. User intervention may be required to correct any errors. Similar to a green task and a red task, a yellow task can be processed directly from the debugging UI.

A task could be in one of following colors and some debugging functions can be performed based on task status.

Figure 6:
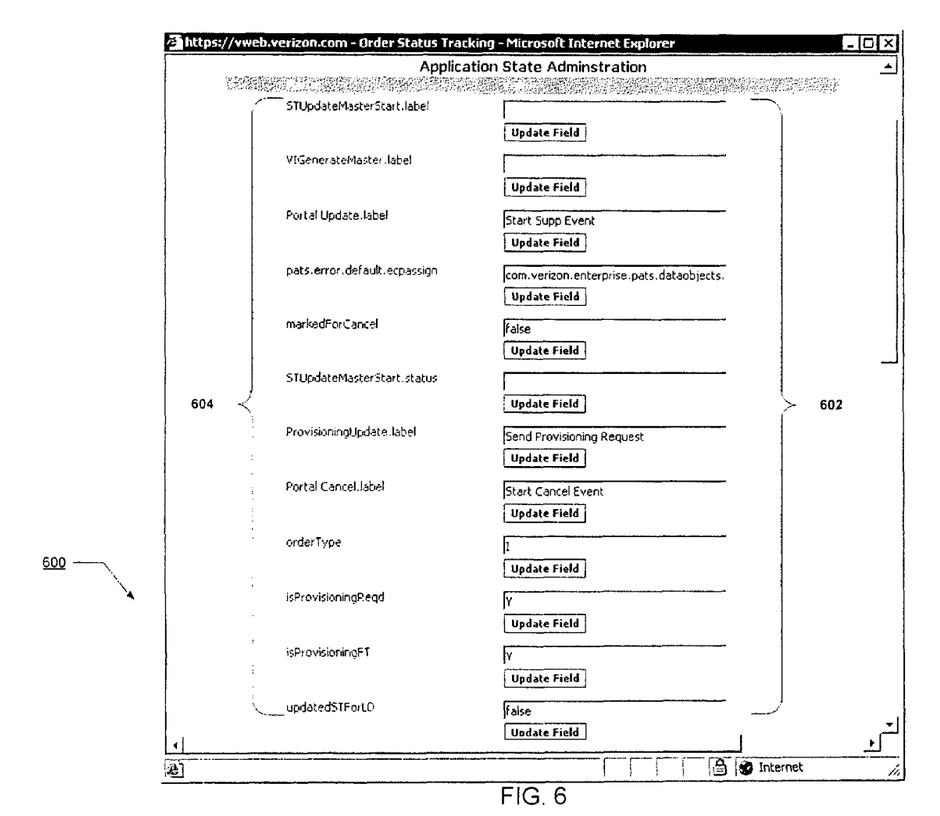
FIG. 6 is an exemplary screen shot for the flow state management user interface as may be used in an embodiment of the present invention.

Similarly, in one embodiment, the UI 230 of the PATS layer 210 provides visibility through which a developer can view and edit flow states. An exemplary screen shot for UI 230 visibility of the flow state management is shown in FIG. 6. Individual values 602 for flow variables 604 can be set or changed in this UI 600. Combined with the flow task execution manipulation as described above in regard to the flow status display for end-to-end visibility of business flows, a developer can change workflow flow's running status to debug and test flow logic. The PATS layer UI 600 may also be used in a production system to provide support and error recovery.

As indicated above, the preferred embodiments of the present invention provide an abstract layer (the PATS layer 210), which helps to make transparent the complexity of workflow engines 224 A unified API 222 provides access to underlying workflow engines 224 so that application flow implementations can be written once, yet run on all supported engines 224. This helps to reduce vendor-dependency to minimal levels. The service provider architecture allows easy plug-in of different workflow engines 224. To include a new workflow engine, new service providers are developed to implement a pre-defined set of APIs. Workflow engines supported by the preferred embodiments include BEA WebLogic Process Integrator and in-house developed workflow engines, among others.

The preferred embodiments allow the development of unified extra services on top of underlying workflow engines 224. For example, the PATS layer 210 can provide unified flow state management, unified work assignment API and user interface, and unified task tracking and flow display diagrams, among other extra services. The PATS layer 210 makes these extra services non-vendor specific and capable of migration/integration on different workflow engines 224. The PATS layer 210 provides a gateway to and from underlying workflow engines 224. It serves to forward an engine's invocation to application handlers, send an application's response to the engine back to the engine, and allows multiple workflow engines 224 co-exist and run smoothly together. This allows an application to make use of any underlying engine by configuration, not by code implementation. Application handlers are modules comprised of application code that is invoked from the PATS layer 210 by the PATS engine 212 for fulfilling workflow tasks. For example, "Provisioning Circuit" may be a task in a workflow. The PATS engine 212 will execute application code (i.e., the application handler) to implement steps to provision a circuit through a backend system. For instance, the application handler may make a call to legacy system.

Flow State Management

Each workflow process can have its own states used for communicating information between tasks inside a workflow manager comprised of a workflow engine. Most workflow management systems (WFMS) keep process model information and the state information for the process instances together with detailed status information on the execution status of the process by the WFMS in some sort of a database system, as are known in the art. Thus the WFMS maintains state information of the WFMS itself and of the process model instance currently executed by the WFMS. The WFMS control functions, such as navigating through a process graph, performing staff resolution, invoking applications, etc. access the WFMS state information, make the appropriate computations, and store new state information.

Because state management implementations vary from workflow engine to workflow engine, the PATS layer 210 implements its own state management outside of the underlying workflow engines 224, which facilitates accessing and performing data reporting and also serves to alleviate vendor dependency. The flow state manager 216 of the PATS layer 210 wraps states defined by the one or more workflow engines 224 and exposes them to the one or more applications via a non-vendor specific API 222. If an application has persistent state information, the PATS layer 210 has, in one embodiment, external storage and an API for handling them. The PATS layer 210 handles this type of state management outside of the underlying workflow engines 224 because state management implementations vary from workflow engine to workflow engine. The PATS flow state manager 226 maintains a superset of underlying workflow engine variables. When defining a flow variable, an application designates whether the variable will be used in a workflow engine 224 or not. The PATS layer 210 manages all such designated flow variables, which includes some variables that are not known to underlying workflow engines 224. This extra feature is provided to overcome some engine's limitations such as variable type. Therefore, PATS state flow manager 226 unifies state management for all workflow engines 225 and, in addition, provides extra features not supported by all workflow engines 224.

In one embodiment, the PATS layer 210 includes scripting support where workflow can be implemented using scripting languages such as JavaScript and BeanShell. This provides the capability to change flow implementation logic in real time without going through a build or redeployment process. Furthermore, it allows one unified way to communicate with all workflow engines 224. Scripting support enables the quick adoption of dynamic business requirements. Although the scripts are invoked by the workflow engines 224, the engines have no knowledge of the scripts and, therefore, the engines are not required to have built-in script support. While flow task handlers are generally implemented by the use of code such as Java code, such handlers may also be implemented in script. The PATS layer 210 stores the script code in text format in a database. When one or more workflow engines 224 execute a task, the PATS engine 212 will compile and execute the script on the fly. Therefore, in this instance, the script is nothing more than a replacement for compiled code. Scripts provide runtime flexibility for changing implementations as it allows task logic to be modified by changing script code in the database.

Scripting is provided through the PATS engine 212 and script content is provided by flow to instruct the PATS engine 212 of tasks that should occur in order to complete a task. For example, a task to perform data validation may be comprised of checking data for errors before passing a request to back-end provisioning system. An exemplary JavaScript script excerpt for performing this task is the following:

if(order.getState()="MA"&&order. getBandwidthInKB ()>1024)setError("Bandwidth can't be large than 1024 KB for state 'MA'.");
return;
}

The exemplary script, above, implements a rule that there are only limited bandwidth offers (no bandwidth should be larger than 1024 KB due to network limitation) available in the state of Massachusetts (MA). Because business rule like this can change rapidly, it is not desirable to implement such logic in compiled code like Java. Scripting enables quick changes and provides flexibility for underlying workflow to be more dynamic and flexible. If some day the network is upgraded and higher bandwidth products are offered in Massachusetts, only the script is required to be changed and a code drop or new system release is not necessary.

When executing a script, the PATS engine 212 generally performs the following operations: the script content is retrieved from a database; a flow context object is set so that the script can access flow information such as the flow state manager; a script "runner" is created based on language type; the script runner is invoked to execute the script; and the returns from executing the script are obtained and used to drive the flow process accordingly.

Monitoring and Logger Utilities

Figure 3:
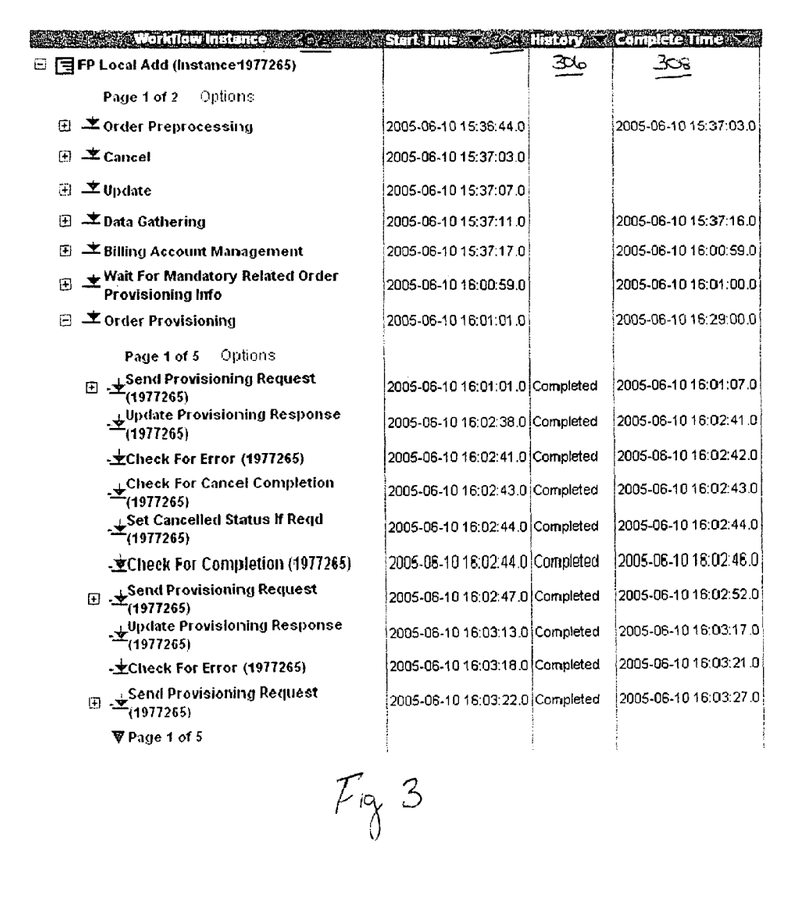
FIG. 3 is an exemplary workflow history logger as may be used in an embodiment of the invention.

In one embodiment, the PATS layer 210 provides a process logger 214 that is configured to monitor and log utilities that are not provided by the one or more workflow engines (e.g., the extra services not provided by PATS layer 210). For instance, the PATS layer 210 systematically logs each task and event (start time, end time, runtime message, etc) that happened inside a flow and build visual tool for monitoring and reporting. One embodiment of a process logger 214 is used to display detailed process history, which is organized in a tree-table data structure and presentation, as shown in FIG. 3. FIG. 3 is an exemplary history of an order. Workflow instances 302 are shown in the first column of FIG. 3 and may include for example events such as "Order Preprocessing," "Order Provisioning," etc. The second column of FIG. 3 is a start time 304 of the workflow instances 302. A history or status field 306 is shown as the third column in the exemplary history logger of FIG. 3. A complete time 308 for completed workflow instances 302 is shown in the fourth column of FIG. 3.

Figure 4:
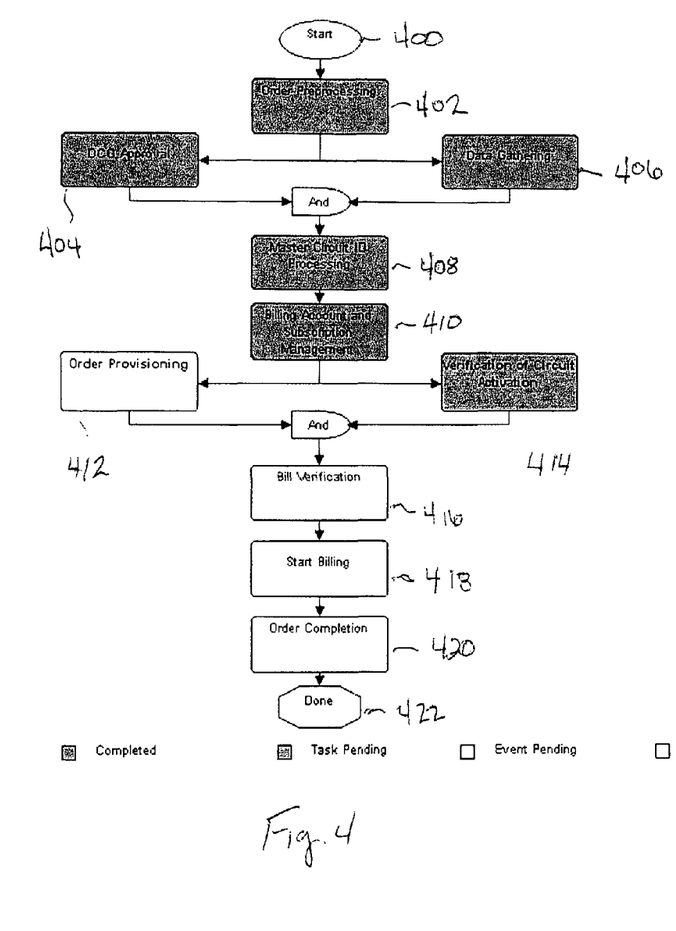
FIG. 4 is an exemplary application workflow as may be used in an embodiment of the invention.

Another tool is to show the running status of all tasks inside a flow in a graph, such as that shown in FIG. 4. FIG. 4 is an exemplary embodiment of a workflow process for online ordering, repair and billing for a telecommunications provider, where an ordering application interacts with the PATS layer and underlying workflow engines. The process starts at Step 400. Step 402, Order Preprocessing, is where an ordering flow is started after taking some user input about detailed order information. This task is to create the order in a database and perform some data validation. Step 404, Document Compliance Group (DCG) Approval, is review by a legal group with responsibility of reviewing telecommunication orders to ensure their compliance to all laws imposed by government. In this instance this is manual step and a DCG member assigned to review the order can either reject or accept this order from user interface. Step 406 is Data Gathering, where based on user input, the telecommunications provider's systems may need extra information about the order. This step is to fill in those data, if necessary. Step 408 is Master Circuit ID Processing. This step is for updating/notifying the telecommunication provider's inventory system for tracking all of its circuits about orders involving new circuits. Step 410, Billing Account and Subscription Management, is a step for creating corresponding billing account generated from the order. Step 412, Order Provisioning, is where one or more backend systems are invoked to provision the order. Step 414, Verification of Circuit Activation, is a step involving the performance of circuit testing and activation. Step 416, Billing Verification, involves a review of the billing record for the user. At Step 418 a billing application is authorized to start the billing process for the order. Step 420 is Order Completion, where there is a clean up temporary data and finish final book-keeping for the order. The workflow process ends at Step 422.

The flow diagram of FIG. 4 can be displayed inside a browser without heavy installation of Java packaging and is similar to a workflow engine's normal monitoring. This enables users to be able to access and display their flow process from anywhere Internet access is available.

Flow Simulator

The flow simulator 218 that is included in one embodiment of the PATS layer 210 assists in application flow development and automation of flow testing. In regular flow development, if flow pauses for some reason (manual work needed, error condition occurred, or waiting for external system to respond, etc), the developer needs to manually perform tasks from the user interface or must wait for the backend system to return, which is time-consuming, un-reliable and un-predictable. The flow simulator 218 is a set of tools provided in the PATS layer 210 to allow flow to be driven automatically/programmatically, even in case of external system dependencies and human interaction. The flow simulator 218 can simulate user input from the UI and finish a task automatically without going through a normal task assignment user interface. The flow simulator 218 can also simulate a backend system's asynchronous response to let flow continue with a predictable data set. This is helpful for unit tests in development, where backend systems may not be accessible. It can also be used in flow recovery in production environment. In one embodiment, an XML file is used to capture the data needed for the simulator (sample data provided below), which assists in configuring and documenting desired flow behavior. Flow can be started and driven to the end with or without human or system interaction, thus providing a testing framework for workflow development. To use a flow simulator, a workflow is started with an instance of simulator. If a simulator is registered with the flow, then the PATS engine 212 forwards all user input or requests to backend systems to the simulator instead of the normal channels, thus the simulator intercepts flow execution. Generally, a simulator is developed by programming code to conform to a standard API to accept all inputs. In one embodiment, the PATS layer 210 provides a default implementation of a simulator, which takes an XML about how simulator should respond to various inputs (see example below).

As referenced above, below is a flow simulator data sample:

```
<PatsSim>
  <template name="LDPL">
    <!-- simulate user input when backend system ST returns error. -->
    <manual name="Please choose bandwidth.">
      <response>
        <custom>128M</custom>
      </response>
    </manual>
    <!-- Simulate backend system ST error response for function 151 -->
    <message eventId="STUpdateMasterStart" functionId="151">
      <response delay="1000">
        <TRANSACTION WfIntanceId="$WF_INSTANCE_ID">
          <Error>
            <ErrorCode>125</ErrorCode>
            <ErrorDescription>LDPL
            UpdateMasterStart
            ERROR, Please Retry</ErrorDescription>
          </Error>
        </TRANSACTION>
      </response>
    </message>
  </template>
</PatsSim>
```

It is to be appreciated that the above data simulates user input as well as backend system responses. For example, when a manual task with a name such as, "Please choose bandwidth" is generated, the flow simulator will automatically respond with an answer such as, "128M"—just like a customer would have from the user interface. Also, when calling a backend system with function id 151, the simulator responds with an error that has code 125. This technique is helpful since an error condition of "normal" is difficult to get from a real system.

The backend system defines a set of error conditions and sends different error code/message back to a workflow for proper handling. While some errors are somewhat routine, others happen only in unique situations and aren't easily reproduced in a testing environment. For example, the backend system might have an error for hard disk failure, which rarely happens in reality. With the PATS flow simulator, error scenarios and test flow error handling logic can be easily created instead of waiting for such unusual errors to happen in a real environment. So, a simulator can send back a hard disk failure error to a flow whenever the test needs it. Similarly, cases can be created for various user inputs without time-consuming operations from the user interface. Using this approach, workflow test cases can run in a controlled environment and provide comprehensive coverage of different error and/or normal scenarios. Not only does this make debugging easier, it also provides opportunities to automate system integration tests at the workflow level.

Methods of Use

The preferred embodiments of the system described above may be used to provide a user with an interface layer between one or more applications and one or more workflow engines. In order to limit the need for tailored programming between each engine and each workflow manager, the embodiments of the present invention provide an API for the applications and a plug-in for the workflow engine, both of which are not vendor specific, so that an application must merely change the configuration without need for deployment of a module.

Figure 5:
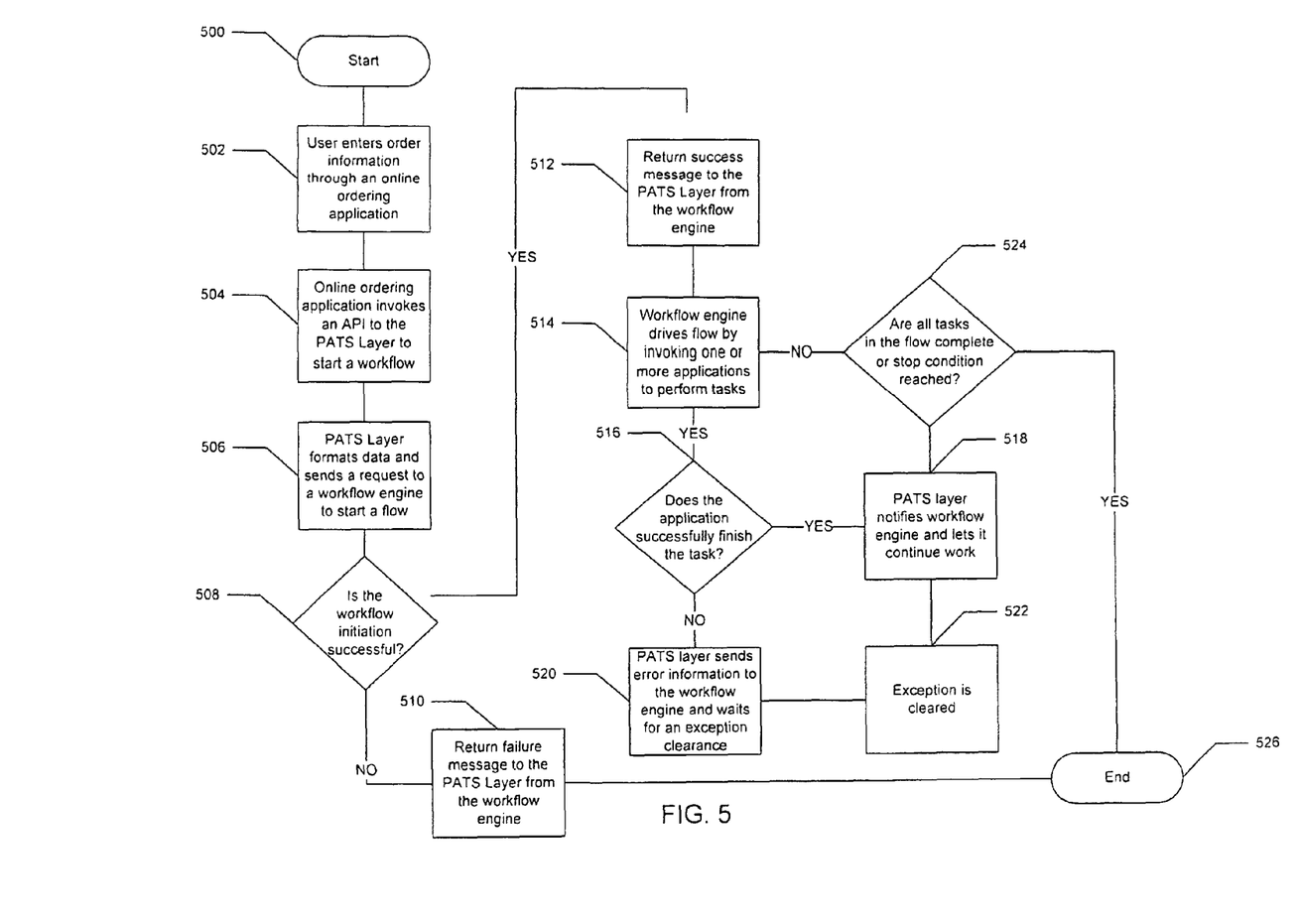
FIG. 5 is a flowchart describing a process for using an embodiment of a system of this invention.

An embodiment of a system is used in a process for online ordering, repair and billing for a telecommunications provider, where an ordering application interacts with the PATS layer and underlying workflow engine. The process is described in the flowchart illustrated in FIG. 5. The process starts at Step 500. At Step 502, a user inputs order information through an online ordering application. For instance, an exemplary order could be an order for Internet Protocol Virtual Private Network (IPVPN) or Frame Relay products that could potentially span multiple regions and systems. At Step 504, the ordering application, after receiving the order information, will invoke an API to the PATS layer to start a workflow. This invocation is done through a synchronous API call or an asynchronous message. At Step 506, and once the PATS layer gets the instruction to start a workflow, it formats the data according to the protocol of underlying workflow engine and sends a request to start a flow there. At Step 508, it is determined if the workflow initiation is successful, or not. The workflow engine returns a success or failure message based on workflow starting status. The message is returned to the PATS layer, not the application, and the PATS layer receives the result and formats it to a unified status message and return the message back to the ordering application. At Step 510, if the workflow initiation is unsuccessful, the failure message is returned to the PATS layer from the workflow engine and the process ends at Step 526. At Step 512, if the workflow initiation is successful, the success message is returned to the PATS layer from the workflow engine. The process then continues to Step 514, where the workflow engine will start to drive the flow. Based on a workflow template definition, the workflow engine invokes one or more application-specific modules. This is done through the PATS layer as well. The workflow engine sends task information to the workflow engine's PATS layer plug-in. The PATS plug-in will then forward the request and invoke an ordering application to fulfill the work. Since a plug-in is normally deployed inside the workflow engine, plug-in invocation by a workflow engine is normally a direct API call. The PATS layer invokes an application via a PATS specification (either EJB or Message interface). At Step 516, it is determined whether the application successfully finishes the task or not. If the application does successfully finish the task, then at Step 518, the PATS layer will notify the workflow engine and let it continue. If the application fails to finish the task, then at Step 520 the PATS layer sends error information to the workflow engine and the engine waits for an exception clearance. At Step 522 the workflow engine receives an exception clearance. Once an exception is cleared at Step 522, the application notifies the PATS layer and the PATS layer tells the workflow engine to resume its task execution at Step 518. At Step 524 it is determined whether the flow is complete or a stop condition reached. If not, then the process returns to Step 514 where the workflow engine will repeat Step 514 through 522 until all tasks in flow are finished or whatever stop condition reached (normally a STOP task node). The process then ends at Step 526.

Modifications and Alternative Embodiments

Many modifications to the preferred embodiments described herein and other embodiments of the invention will come to mind to one skilled in the art to which this invention pertains having the benefit of the teachings presented in the foregoing descriptions. For instance, the trusted sources and their recommendations may be provided audibly rather than visually. Accordingly, it should be understood that the invention is not to be limited to the specific embodiments disclosed and that modifications and other embodiments are intended to be included within the scope of the appended exemplary inventive concepts. Although specific terms are employed herein, they are used in a generic and descriptive sense only and not for purposes of limitation.

That which is claimed:

1. A computer-implemented method of providing unified functions utilizing an abstraction layer in a workflow environment comprising the steps of:
    interfacing, by operation of a computer, one or more workflow engines and one or more business applications through said abstraction layer, the one or more workflow engines providing for automation of one or more business processes included in a workflow;
    intercepting, by operation of said computer and via a flow simulator within said abstraction layer, a workflow task in workflow execution associated with the workflow, the abstraction layer including scripting support that enables changing flow implementation logic and adopting dynamic business requirements in real time; and
    generating, by the flow simulator within said abstraction layer and based on flow simulator data representing a desired workflow behavior, a simulated response to the intercepted workflow task, the intercepted workflow task being part of the one or more business processes, the one or more business processes controlling how work of a business is performed.

2. The method of claim 1, further comprising providing, by operation of said computer and via said abstraction layer, the simulated response generated by the flow simulator to the one or more workflow engines.

3. The method of claim 1, wherein the flow simulator automatically generates the simulated response within said abstraction layer based exclusively on the intercepted workflow task and the flow simulator data representing the desired workflow behavior.

4. The method of claim 1, wherein the simulated response simulates user input received from a user interface in response to the intercepted workflow task.

5. The method of claim 1, wherein the simulated response simulates an error condition of the one or more business applications.

6. The method of claim 1, wherein the simulated response comprises a simulated hard disk failure error.

7. The method of claim 1, wherein the one or more business processes control assigning one or more tasks to a user.

8. The method of claim 7, wherein:
    the abstraction layer includes an abstraction engine configured to execute application code to facilitate the one or more tasks of the one or more business processes, and
    the method further comprises forwarding, by the abstraction engine, the one or more tasks to the flow simulator instead of assigning the one or more tasks to the user when the flow simulator is registered with the one or more business processes.

9. The method of claim 1, further comprising providing, in the abstraction layer, a user interface that provides a user with a consistent interface appearance regardless of which of the one or more workflow engines is servicing the one or more business applications through the abstraction layer.

10. The method of claim 1, further comprising monitoring, by a flow state manager provided in the abstraction layer, states of the one or more workflow engines and providing the states of the one or more workflow engines to the one or more business applications via a non-vendor specific unified application program interface.

11. A system comprising:
    a processor; and
    an abstraction layer comprised of computer-implemented instructions stored on a computer-readable storage medium and configured to instruct the processor to provide an interface between one or more workflow engines and one or more business applications, the abstraction layer including scripting support that enables changing flow implementation logic and adopting dynamic business requirements in real time, the one or more workflow engines providing for automation of one or more business processes included in a workflow;
    wherein the abstraction layer includes
        a unified application program interface ("API") through which the one or more business applications interact with the abstraction layer,
        one or more workflow engine plug-ins through which the one or more workflow engines interact with the abstraction layer, and
        a flow simulator configured to intercept a workflow task in workflow execution and generate, based on flow simulator data representing a desired workflow behavior, a simulated response to the intercepted workflow task, the intercepted workflow task being part of the one or more business processes, the one or more business processes controlling how work of a business is performed.

12. The system of claim 11, wherein the flow simulator is configured to generate the simulated response within said abstraction layer based exclusively on the intercepted workflow task and the flow simulator data representing the desired workflow behavior.

13. The system of claim 11, wherein the simulated response simulates user input received from a user interface in response to the intercepted workflow task.

14. The system of claim 11, wherein the simulated response simulates an error condition of the one or more business applications.

15. The system of claim 11, wherein the abstraction layer further includes an abstraction engine configured to execute application code for fulfilling one or more tasks of a workflow process provided by one of the one or more business applications.

16. The system of claim 15, wherein the abstraction engine is further configured to forward the workflow execution to the flow simulator instead of to normal channels when the flow simulator is registered with the workflow process.

17. The system of claim 11, wherein the abstraction layer further includes a user interface that displays a task status for each task in a workflow process.

18. The system of claim 11, wherein the abstraction layer further includes a user interface that allows a developer to view and edit unified flow states of a workflow process.

19. A computer-implemented method comprising:
interfacing, by operation of a computer and via an abstraction layer, one or more workflow engines and one or more business applications, the one or more workflow engines providing for automation of one or more business processes included in a workflow;
intercepting, by operation of said computer and via a flow simulator within the abstraction layer, a workflow task in workflow execution associated with the workflow, the abstraction layer including scripting support that enables changing flow implementation logic and adopting dynamic business requirements in real time; and
generating, by the flow simulator within the abstraction layer and based on flow simulator data representing a desired workflow behavior, a simulated response to the intercepted workflow task, the intercepted workflow task being part of the one or more business processes, the one or more business processes controlling how work of a business is performed.

20. The method of claim 19, wherein the flow simulator automatically generates the simulated response within the abstraction layer based exclusively on the intercepted workflow task and the flow simulator data representing the desired workflow behavior.

21. The method of claim 19, wherein the simulated response simulates user input received from a user interface in response to the intercepted workflow task.

22. The method of claim 19, wherein the simulated response simulates an error condition of the one or more business applications.

23. The method of claim 19, further comprising forwarding, by an abstraction engine within the abstraction layer, the workflow execution to the flow simulator instead of to normal channels when the flow simulator is registered with the workflow.

24. The method of claim 19, further comprising providing, by the abstraction layer, a user interface that displays a task status for each task in the workflow.

25. The method of claim 19, further comprising providing, by the abstraction layer, a user interface that allows a developer to view and edit unified flow states of the workflow.

26. The method of claim 19, wherein the simulated response comprises a simulated hard disk failure error.

27. The method of claim 19, further comprising providing, by operation of said computer and via said abstraction layer, the simulated response generated by the flow simulator to the one or more workflow engines.

* * * * *